United States Patent
Jayakumar et al.

(10) Patent No.: US 12,008,359 B2
(45) Date of Patent: Jun. 11, 2024

(54) UPDATE OF BOOT CODE HANDLERS

(71) Applicant: Intel Corporation, Santa Clara, CA (US)

(72) Inventors: Sarathy Jayakumar, Portland, OR (US); Mohan J. Kumar, Aloha, OR (US); Murugasamy K. Nachimuthu, Beaverton, OR (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 834 days.

(21) Appl. No.: 16/790,488

(22) Filed: Feb. 13, 2020

(65) Prior Publication Data

US 2020/0257521 A1   Aug. 13, 2020

(51) Int. Cl.
G06F 8/656 (2018.01)
G06F 9/4401 (2018.01)
G06F 21/57 (2013.01)

(52) U.S. Cl.
CPC ............ *G06F 8/656* (2018.02); *G06F 9/4401* (2013.01); *G06F 21/572* (2013.01); *G06F 2221/033* (2013.01)

(58) Field of Classification Search
CPC ...... G06F 8/656; G06F 9/4401; G06F 21/572; G06F 2221/033
See application file for complete search history.

(56) References Cited

U.S. PATENT DOCUMENTS

| | | | |
|---|---|---|---|
| 9,176,752 B1 | 11/2015 | Marr et al. | |
| 2007/0266265 A1* | 11/2007 | Zmudzinski | G06F 1/3203 |
| | | | 713/300 |
| 2008/0222449 A1* | 9/2008 | Ramgarajan | G06F 11/1666 |
| | | | 714/5.11 |
| 2010/0064127 A1 | 3/2010 | Lee | |
| 2013/0031538 A1* | 1/2013 | Skalsky | G06F 9/4418 |
| | | | 717/168 |
| 2016/0085558 A1* | 3/2016 | Anbazhagan | G06F 9/4401 |
| | | | 713/2 |
| 2017/0046229 A1 | 2/2017 | Hsu et al. | |
| 2017/0242598 A1 | 8/2017 | Nijhawan et al. | |

(Continued)

FOREIGN PATENT DOCUMENTS

KR   20060008131 A   1/2006

OTHER PUBLICATIONS

International Search Report and Written Opinion for PCT Patent Application No. PCT/US20/66736, dated Apr. 19, 2021, 11 pages.

(Continued)

*Primary Examiner* — Jaweed A Abbaszadeh
*Assistant Examiner* — Hyun Soo Kim
(74) *Attorney, Agent, or Firm* — Compass IP Law PC

(57) ABSTRACT

Examples described herein provide a central processing unit (CPU) to reserve a region of memory for use to store both a boot firmware code and a second boot firmware code and to perform the second boot firmware code without reboot. The reserved region of memory can be a region that is not configured for access by an operating system (OS). The reserved region of memory comprises System Management Random Access Memory (SMRAM). If a first interrupt handler is not overwritten after a second boot firmware code is stored, the CPU can roll back to use of the first interrupt handler.

20 Claims, 5 Drawing Sheets

(56) References Cited

U.S. PATENT DOCUMENTS

| | | |
|---|---|---|
| 2018/0293187 A1 | 10/2018 | Radhakrishnan et al. |
| 2018/0321947 A1* | 11/2018 | Liu .................. G06F 9/4401 |
| 2019/0179628 A1 | 6/2019 | Bulusu et al. |
| 2021/0240489 A1* | 8/2021 | Xie .................. G06F 21/572 |

OTHER PUBLICATIONS

Collins, Robert R., "Intel's System Management Mode", http://www.rcollins.org/ddj/Jan97/Jan97.html, Jan. 1997, 5 pages.
Intel, "Intel® 64 and IA-32 Architectures Software Developer's Manual", vol. 3C: System Programming Guide, Part 3, Chapter 34, "System Management Mode", Sep. 2016, 30 pages.
Intel, "Relability, Availability and Serviceability (RAS) Integration and Validation Guide for the Intel ® Xeon ® Processor E7-V3 Family, Error Reporting through EMCA Gen 2", Apr. 2015, 32 pages.
Yuan, Spike, et. al., "Server RAS and UEFI CPER", presented by Intel, Spring 2017 UEFI Seminar and Plugfest, Mar. 27-31, 2017, 26 pages.
Partial European Search Report for Patent Application No. 20918730. 1, dated Aug. 2, 2023, 12 pages.

\* cited by examiner

UPDATE OF BOOT CODE HANDLERS

In a platform with a central processing unit (CPU) such as a server or personal computer (PC), System Management Mode (SMM) is a most privileged operating mode of a CPUs in which all other running tasks are suspended, including the operating system. SMM involves managing and handling various platform events such as errors and other reliability, availability and serviceability (RAS) events.

DETAILED DESCRIPTION

Figure 1:
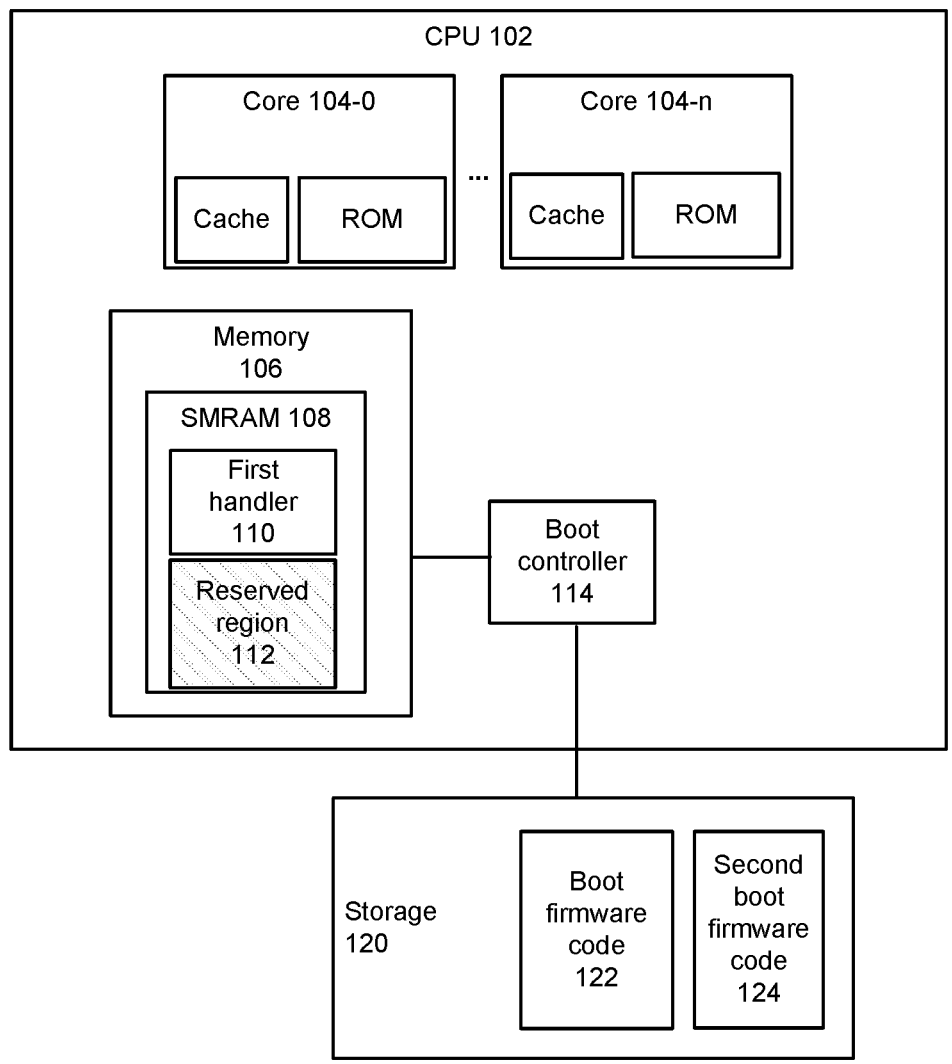
FIG. 1 depicts a CPU.

SMM can be used for handling runtime events that involve specific silicon and platform configurations and capabilities (e.g., reliability availability and serviceability (RAS) events, memory, connection errors, or other failure conditions), in an OS transparent fashion, which can be platform and silicon specific. SMM can be invoked by a System Management Interrupt (SMI) and exited by a Resume from a System Management Mode (RSM) instruction. An SMI can be generated by platform events such as RAS, power management, thermal events or via software triggered SMIs. SMIs are a high priority, non-maskable, broadcast interrupt. On receipt of this interrupt, the CPU(s) in the system save their context and transition to SMM. An SMI handler, copied from BIOS flash to System Management RAM (SMRAM) during boot, executes during SMM.

As a runtime component, an SMI handler can be updated for a variety of reasons such as bug fixes, security patches, feature enhancements and so forth. SMI handler updates are deployed as part of a BIOS update. Updating a BIOS (and the SMI handler) can involve a system reset. In data center and cloud environments, where fleets of hundreds of thousands of server nodes are being deployed, resetting them introduces unavailability of the server nodes. This platform reset is a very expensive downtime for cloud service providers (CSPs) hosting a variety of critical workloads. In other words, updating a BIOS causes non-monetizable downtime and potentially failure to achieve service level agreements (SLAs) with customers.

In SMM, a CPU saves the context of its executed instructions. The context can be saved into System Management Random Access Memory (SMRAM). The SMI handler then sets up its own environment (e.g., page tables, Interrupt Redirection Tables (IDTs)) and executes code that is placed by the platform BIOS in an area of SMRAM. In some cases, SMRAM is an area of memory that is hidden from the OS such that the OS cannot access or configure the SMRAM. For example, from outside of SMM, any writes to SMRAM are not performed and reads will result in return a static value, for example, all F, 0s, or −1s. SMRAM is accessible to processors which have entered SMM. During SMM, the CPU can continue to execute an OS or virtualized execution environment. For an example description of SMM, see Intel® 64 and IA-32 Architectures Software Developer's Manual, System Programming Guide, Volume 3C: System Programming Guide, Part 3, which is incorporated by reference in its entirety.

Various embodiments provide updating or modifying boot firmware code or system management mode handler without platform reset or a reboot of a CPU that is to execute the updated or modified boot firmware code or system management mode handler. Various embodiments securely add an alternative or second SMI handler for use in addition to a first SMI handler, that is also available to use after receipt of the second SMI handler. The second SMI handler can be stored in a different region of SMRAM than that of the first SMI handler. The second SMI handler can be an update as compared to the first SMI handler. Securely adding a second SMI can occur by decrypting the second SMI using public and private keys at the platform. Boot firmware code can configure or re-configure system software at or after boot.

While in SMM, the processor executes SMI handler code to perform operations such as powering down unused storage or displays, executing proprietary code, or placing the whole system in a suspended state. When the SMI handler has completed its operations, it executes a resume (RSM) instruction. After an alternative or second SMI is added, in response to a subsequent SMI, the CPU platform (or its boot core or processor) can load the second SMI.

To update an SMI handler, various embodiments can perform one or more of: (1) store the new SMI handler as an UEFI capsule (e.g., part of a boot firmware code update), (2) authenticate the staged image from within the existing SMM handler (e.g., authentication libraries in a current or former SMI handler can authenticate the new SMI handler or boot firmware code), (3) decline or accept the new SMI handler code, or (4) install accepted SMI handler code within an SMM. Note that (3) and (4) can be performed by the current SMI handler and executed during runtime.

In various embodiments the first SMI handler is not overwritten. Various embodiments provide a capability to roll back to use of the first SMI handler. For example, if the second SMI has bugs or errors, or any reason, after a subsequent SMI, the platform can switch to use the first SMI handler.

Accordingly, reboot or reset of a CPU is not needed (but can take place) in the event of an update to an SMI handler because the updated SMI handler is used during a next SMI or interrupt during runtime. Moreover, virtualized execution environments or operating systems need not be rebooted during an addition of an SMI handler or boot firmware code. Data center owners and cloud service providers can potentially avoid downtime due to updating an SMI handler or boot firmware code. In addition, vendors of CPUs or processors have the capability to avoid or reduce downtime in the event of updating of an SMI handler or boot firmware code.

FIG. 1 depicts an embodiment. Central processing unit (CPU) 102 can include cores 104-0 to 104-n. A core can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh.

A core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein.

CPU 102 causes boot controller 114 to access boot firmware code from storage 120. Boot firmware code can have a header file that identifies a map of what boot code is to be copied by CPU 102. For example, a .h file for a boot firmware code can have a flash image layout map of which segments of the boot firmware code are to be copied. When executed by a processor, boot firmware code can be executed by a processor to perform hardware initialization during a booting process (e.g., power-on startup), and provide run-time services for operating systems and programs. Some examples of portions of boot firmware code (e.g., SMI handler) can configure or re-configure system software at or after boot.

In some embodiments, boot firmware code can be one or more of: Basic Input/Output System (BIOS), Universal Extensible Firmware Interface (UEFI), or a boot loader. The BIOS firmware can be pre-installed on a personal computer's system board or accessible through an SPI interface from a boot storage (e.g., flash memory). In some examples, a BIOS can be stored on a device and accessible from the device by one or more cores or CPUs using an interface such as Serial Peripheral Interface (SPI) or other interface (e.g., PCIe). BIOS can initialize and test the system hardware components and loads a boot loader from a memory device which initializes and executes an operating system. The OS, in some examples can be Linux®, Windows®, FreeB SD®, Android®, MacOS®, iOS®, or any other operating system. The OS and driver can execute on a CPU sold or designed by Intel®, ARM®, AMD®, Qualcomm®, IBM®, Texas Instruments®, among others.

In some examples, a Universal Extensible Firmware Interface (UEFI) can be used instead or in addition to a BIOS for booting or restarting cores or processors. UEFI is a specification that defines a software interface between an operating system and platform firmware. UEFI can read from entries from disk partitions by not just booting from a disk or storage but booting from a specific boot loader in a specific location on a specific disk or storage. UEFI can support remote diagnostics and repair of computers, even with no operating system installed. A boot loader can be written for UEFI and can be instructions that a boot code firmware can execute and the boot loader is to boot the operating system(s). A UEFI bootloader can be a bootloader capable of reading from a UEFI type firmware.

Boot controller 114 can be any type of controller (e.g., microcontroller) capable of managing boot firmware code loading and storage into memory 106. In some examples, boot controller 114 can be coupled to storage 120 using one or more of the following protocols: serial peripheral interface (SPI), enhanced SPI (eSPI), PCIe, or other interface. In some examples, storage 120 can be connected to boot controller 114 using a fabric or network and transmitted using a packet.

Memory 106 can be any type of volatile or non-volatile memory. For example, by execution of a boot firmware code, memory 106 can allocate a portion of its addressable memory as SMRAM 108. SMRAM 108 can be an area of memory 106 that is hidden from the OS such that the OS cannot access or configure SMRAM 108. For example, from outside of SMM, any writes to SMRAM 108 are not performed and reads will result in return of a static value, for example, all F, 0s, or −1s. SMRAM 108 can be accessible to processors which have entered SMM.

During normal boot, execution of boot firmware code by a core (e.g., a boot strap processor (BSP) core that executes boot firmware on a CPU node) causes installation of at least one SMM handler (e.g., first handler 110) as part of the boot process. In addition, execution of boot firmware code also allocates additional memory space in the SMRAM for accepting at least one more SMM handler or other portion of replacement boot firmware code, shown as reserved region 112.

In some examples, a boot firmware code build process generates an alternative or second SMM handler that is the same or different than any current or prior SMM handler stored in SMRAM 108. The second SMM handler can be, for example, an UEFI capsule. A UEFI capsule is an industry standard way of encapsulating a binary image for boot firmware code updates. But in some embodiments, the UEFI capsule is used to update a runtime component of the boot firmware code. In some cases, modification of boot firmware code in SMRAM 108 can involve use of an alternative or second SMM handler. The UEFI capsule can include updatable binary images with relocatable Portable Executable (PE) file format for executable or dynamic linked library (dll) files based on COFF (Common Object File Format). For example, the UEFI capsule can include executable (*.exe) files. This UEFI capsule can be deployed to a target platform as an SMM image via existing OS specific techniques (e.g., Windows Update for Azure, or LVFS for Linux).

An Update Tool executed on CPU 102 (e.g., an OS tool (in band) or baseboard management controller (BMC) (out of band)) identifies boot firmware code updates in storage 120. For example, the Update Tool can read a flag stored in memory and indicate if there is an update to boot firmware code. In some cases, an Update Tool can receive indications that there is an update to boot firmware code. In response to an indication of a second boot firmware code 124 in storage 120, the Update Tool invokes first SMI handler 110 and indicates a new boot firmware code image is available to authenticate.

Execution of first SMI handler 110 causes authentication of second boot firmware code 124. Secure Sockets Layer (SSL) can be used to authenticate second boot firmware code 124. If second boot firmware code 124 is encapsulated in a UEFI capsule, the signature of the capsule can be validated using public and private key decryption. For example, a boot code supplier generates boot code supplier signed with a public key and a private key is stored in SMRAM 108. The private key can be used to authenticate the signature of the capsule.

If there is authentication of the signature, first SMI handler 110 accepts the image and informs the Update Tool that invokes SMRAM update that second boot firmware code 124 is valid and accepted for use. In some examples, if authenticated, second boot firmware code 124 is stored in storage 120 and copied to reserved region 112. In some examples, second boot firmware code 124 is stored in reserved region 112 and authenticated from reserved region 112. If second boot firmware code 124 is authenticated, then second boot firmware code 124 can be used. However, if second boot firmware code 124 is not authenticated, then the second boot firmware code 124 can be ignored, deleted or overwritten.

An Update Tool or administrator can trigger or approve a switch to use of second boot firmware code 124. Use of second boot firmware code 124 can occur by changing a pointer to indicate use of second boot firmware code 124 and/or a second SMI handler received with second boot firmware code 124. In some examples, first handler 110 can be overwritten with a second handler.

In some examples, roll-back from a second handler to a first handler 110 can be performed. If a problem occurs with an alternative or second handler in reserved region 112, the CPU can roll back or use first handler 110. An Update Tool or administrator can trigger or approve a switch to use of first handler or another boot firmware code stored in SMRAM 108. For example, a version number of a handler can be specified to identify a handler to use.

In some examples, any core can execute a packet processing process as an application or part of a virtual execution environment. Packet processing process can perform processing of received packets such as one or more of: determination if a packet is valid (e.g., correct Ethernet type, correct checksum, correct IP Protocol type, valid layers 4-7 protocol type), determination of packet destination (e.g., next hop, destination queue), match-action activity, or perform one or more of: IP filter checks, flow table lookup, access control lists (ACL), firewall, match-actions operations, outgoing port selection using a forwarding table, packet decryption, packet encryption, denial of server protection, packet counting, billing, traffic management/conditioning, traffic shaping/traffic scheduling, packet marking/remarking, packet inspection of layers 4-7, or traffic load balancing/load distribution. For example, packet processing process can perform Data Plane Development Kit (DPDK) or OpenDataPlane (ODP) compatible packet processing.

A packet can include a header and payload. A header can be a media access control (MAC) source and destination addresses, Ethertype, Internet Protocol (IP) source and destination addresses, IP protocol, Transmission Control Protocol (TCP) port numbers, virtual local area network (VLAN) or Multi-Protocol Label Switching (MPLS) tags.

A packet processing process can perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

Any core can execute a virtualized execution environment. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

Figure 2:
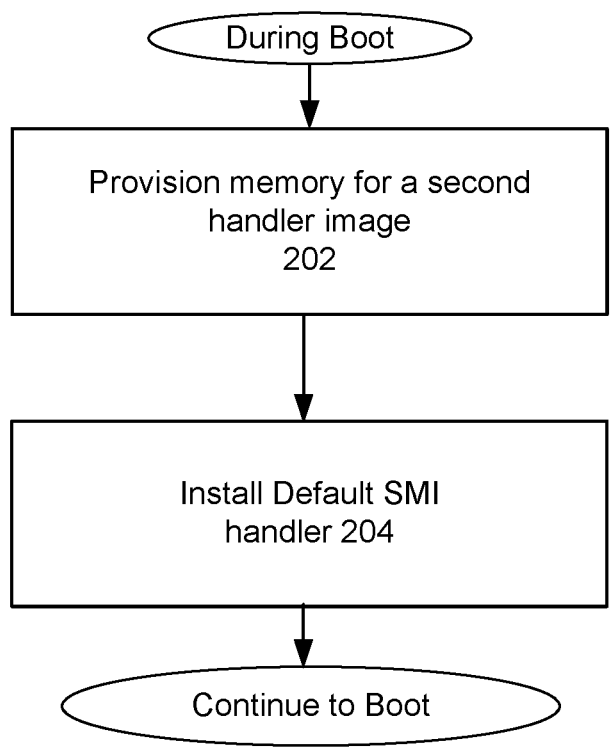
FIGS. 2 and 3 depict example processes.

FIG. 2 depicts a process that can be performed by a processor during a boot operation. At 202, in connection with execution of boot firmware code, a region of memory is allocated to include a boot firmware code. For example, the region of memory can be SMRAM. The additional region can be allocated to store at least a second handler and potentially other boot firmware code.

At 204, in connection with execution of boot firmware code, a default SMI handler can be stored into the region of memory to store boot firmware code. For example, a first SMI handler can be stored into SMRAM but the SMRAM can have left over space for the additional region to store at least a second handler or boot firmware code. The process can continue to boot using the available boot firmware code.

Figure 3:
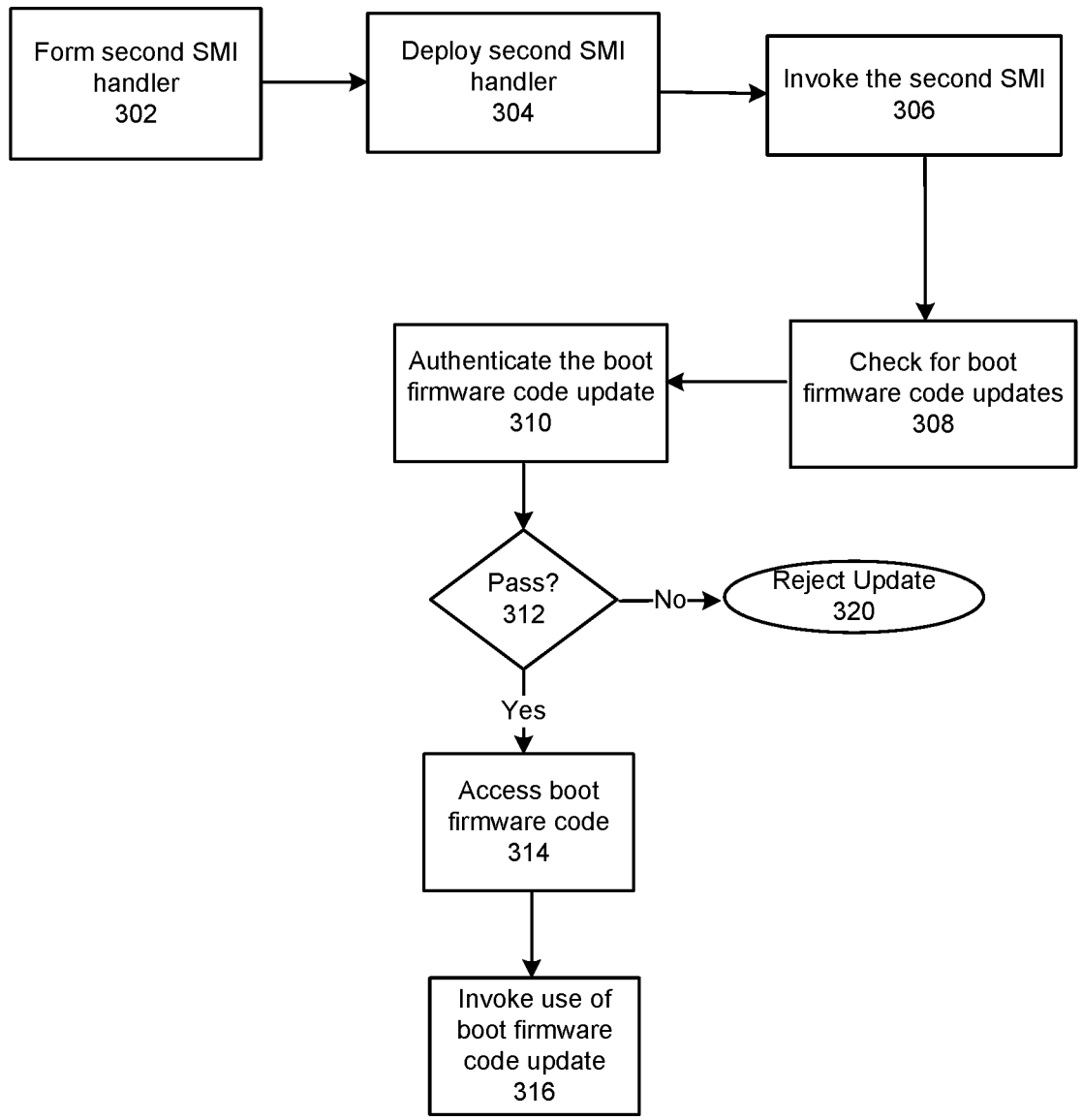

FIG. 3 depicts a process that can be used to provide another SMI handler and/or boot firmware code. Actions 302-306 can be performed by an administrator to deploy a boot firmware code to one or more CPU nodes. At 302, a second SMI handler image is formed. For example, the second SMI handler can be the same or different than a prior SMI handler that is loaded on a platform with one or more CPU nodes. The second SMI handler can be formed within a capsule such as a UEFI capsule. At 304, the second SMI handler can be deployed. For example, deployment can involve providing the second SMI handler via an OS or virtual execution environment specific deployment manner. For example, for Windows operating system, Windows Update (WU) can be used to deploy and authenticate a second SMI handler. For Linux, Linux Vendor Firmware Service (LVFS) can be used to deploy and authenticate the second SMI handler.

At 306, the second SMI handler can be invoked. For example, when the second SMI handler is formed within a UEFI capsule, the UEFI capsule can be invoked in order to copy a second boot firmware code (e.g., second SMI handler) from boot firmware storage to SMRAM. For example, instruction Invoke UEFI UpdateCapsule( ) can be used to copy a second boot firmware code (e.g., second SMI handler) from boot firmware storage to SMRAM.

Actions 308-316 can be performed by one or more CPU platforms. At 308, a check can be made for any boot firmware code update. A current SMI handler can be used to check for any updates to boot firmware code stored in boot storage. For example, a Port 0xB2 write can be used to check for a firmware code stored in boot storage. In this example, a boot firmware code update is stored in boot storage. In some examples, the boot firmware code update includes an SMI handler.

At 310, the boot firmware code newly identified to be stored in boot storage is authenticated to determine if the boot firmware code can be executed. For example, various validation procedures can take place such as but not limited to use of secure sockets layer (SSL) or Transport Layer Security (TLS) to ensure that the boot firmware code is authentic or use of public-private key encryption to authenticate the boot firmware code. An Update Tool can identify boot firmware code updates in storage.

At 312, a determination is made if the authentication passed. If authentication passed, the process continues to 314 but if authentication fails the process continues to 320.

At 314, the boot firmware code update is accessible for use. For example, the boot firmware code update can be copied to SMRAM from a boot storage.

At 316, the boot firmware code update is invoked for use. For example, a pointer can be updated to point to a memory address of the boot firmware code update in SMRAM to cause loading and use of the boot firmware code update. For example, if the boot firmware code update includes a second SMI handler, the second SMI handler can be used to response to an SMI or interrupt during runtime.

At 320, the boot firmware code update is rejected. An administrator can be notified as the attempt to load another boot firmware code may be a malicious attack and further attack or impact can be stopped. The boot firmware code that was not authenticated can be deleted or overwritten in some examples.

Figure 4:
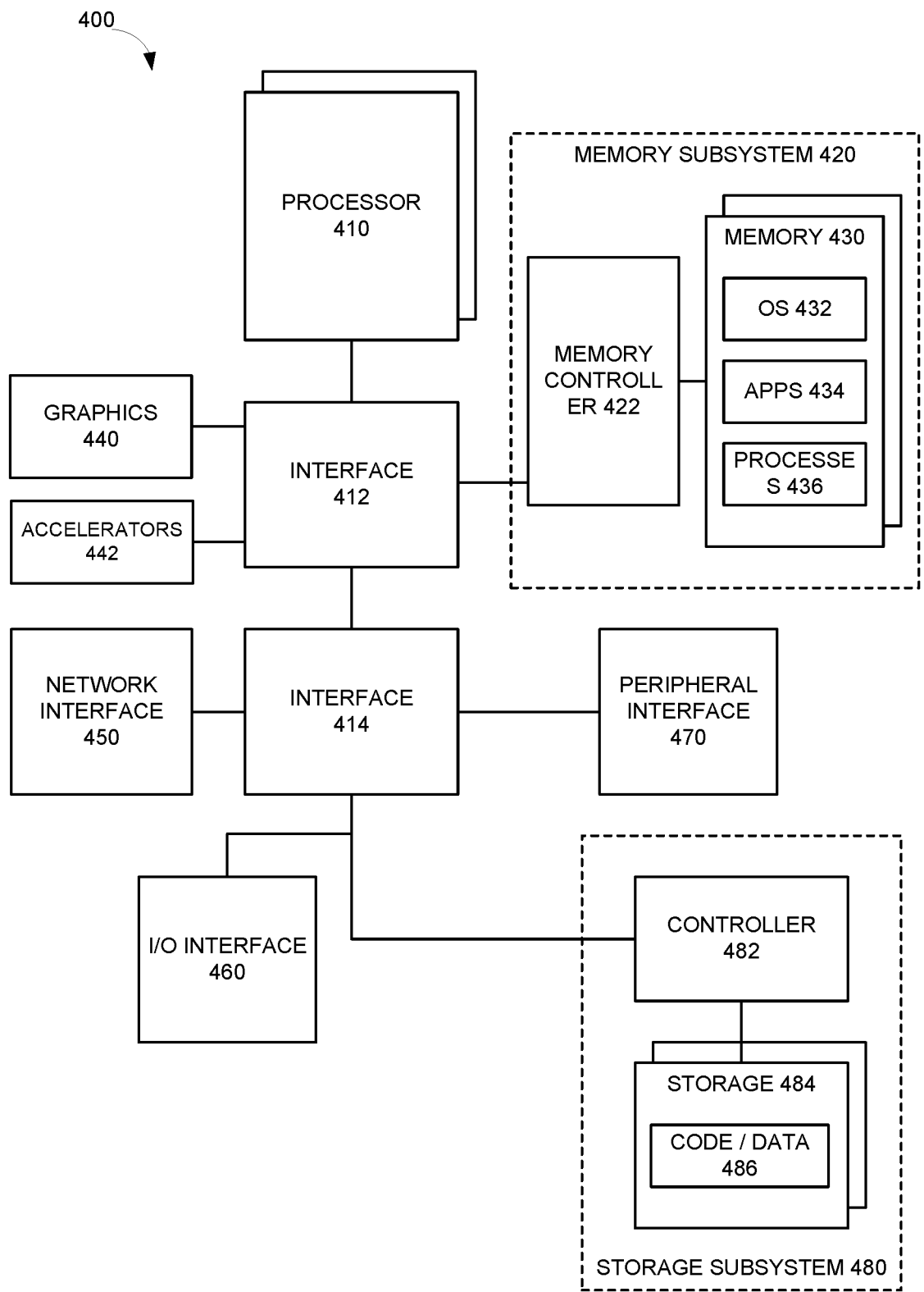
FIG. 4 depicts a system.

FIG. 4 depicts a system. Various embodiments can be used by system 400 to update or access another boot firmware code without rebooting or restarting a CPU or processor. System 400 includes processor 410, which provides processing, operation management, and execution of instructions for system 400. Processor 410 can include any type of microprocessor, central processing unit (CPU), graphics processing unit (GPU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 400 includes interface 412 coupled to processor 410, which can represent a higher speed interface or a high throughput interface for system components that needs higher bandwidth connections, such as memory subsystem 420 or graphics interface 440, or accelerators 442. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 1120p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Accelerators 442 can be a programmable or fixed function offload engine that can be accessed or used by a processor 410. For example, an accelerator among accelerators 442 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 442 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 400 includes interface 414, which can be coupled to interface 412. In one example, interface 414 represents an interface circuit, which can include stand-alone components and integrated circuitry. In one example, multiple user interface components or peripheral components, or both, couple to interface 414. Network interface 450 provides system 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 450 can receive data from a remote device, which can include storing received data into memory. Various embodiments can be used in connection with network interface 450, processor 410, and memory subsystem 420.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a nonvolatile manner, such as one or more magnetic, solid state, or optical based disks, or a combination. Storage 484 holds code or instructions and data 1046 in a persistent state (e.g., the value is retained despite interruption of power to system 400). Storage 484 can be generically considered to be a "memory," although memory 430 is typically the executing or operating memory to provide instructions to processor 410. Whereas storage 484 is nonvolatile, memory 430 can include volatile memory (e.g., the value or state of the data is indeterminate if power is interrupted to system 400). In one example, storage subsystem 480 includes controller 482 to interface with storage 484. In one example controller 482 is a physical part of interface 414 or processor 410 or can include circuits or logic in both processor 410 and interface 414.

A volatile memory is memory whose state (and therefore the data stored in it) is indeterminate if power is interrupted to the device. Dynamic volatile memory can involve refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 400 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Various embodiments can be used in a base station that supports communications using wired or wireless protocols (e.g., 3GPP Long Term Evolution (LTE) (4G) or 3GPP 5G), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 5:
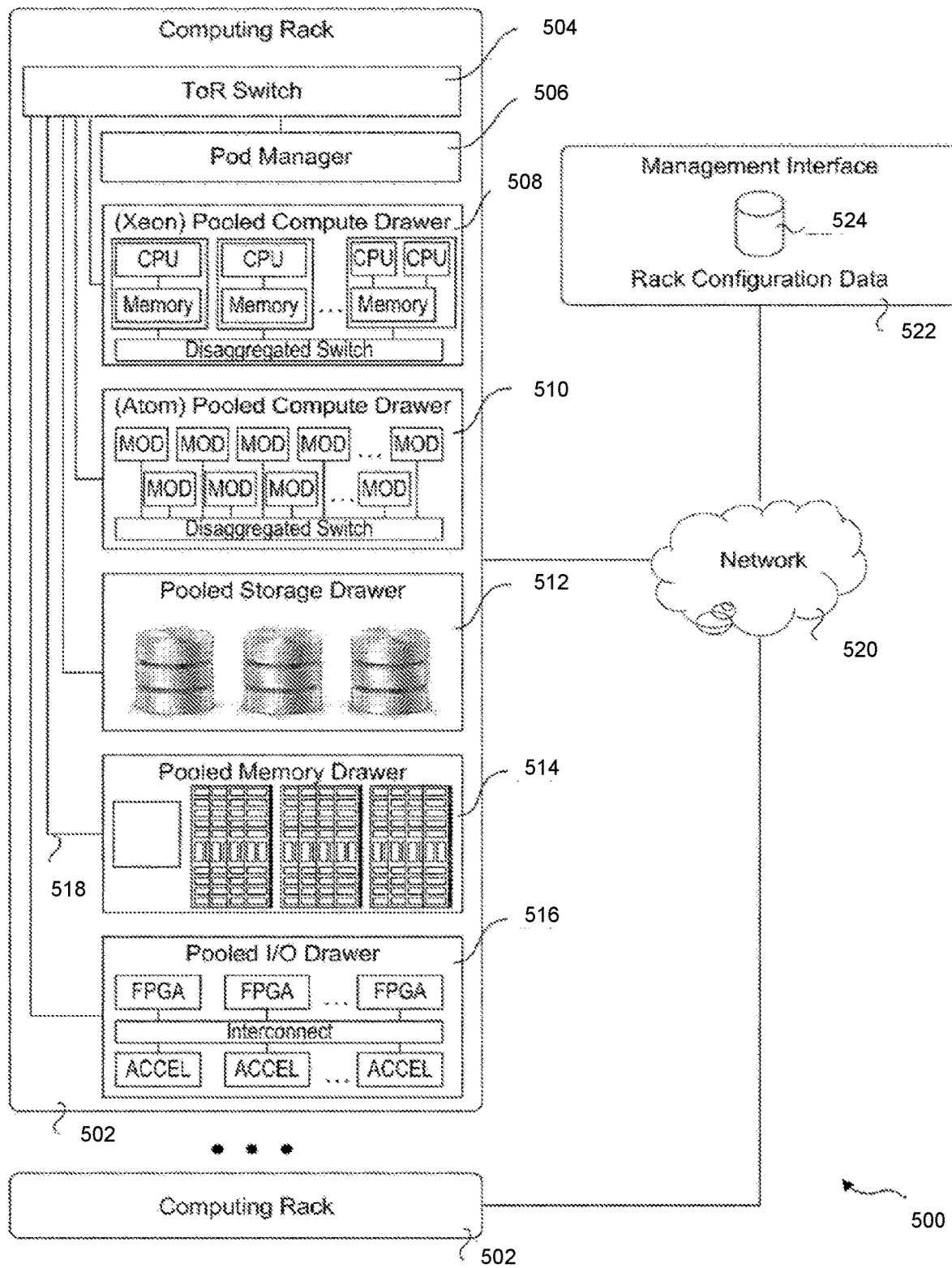
FIG. 5 depicts an example environment.

FIG. 5 depicts an environment 500 includes multiple computing racks 502, one or more including a Top of Rack (ToR) switch 504, a pod manager 506, and a plurality of pooled system drawers. Various embodiments can be used among racks to share content or data or results of processing or storing content. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 508, and Intel® ATOM™ pooled compute drawer 510, a pooled storage drawer 512, a pooled memory drawer 514, and a pooled I/O drawer 516. Any of the pooled system drawers is connected to ToR switch 504 via a high-speed link 518, such as a 40 Gigabit/second (Gb/s) or 100 Gb/s Ethernet link or a 100+Gb/s Silicon Photonics (SiPh) optical link, or higher speeds.

Multiple of the computing racks 502 may be interconnected via their ToR switches 504 (e.g., to a pod-level switch or data center switch), as illustrated by connections to a network 520. In some embodiments, groups of computing racks 502 are managed as separate pods via pod manager(s) 506. In one embodiment, a single pod manager is used to manage all of the racks in the pod. Alternatively, distributed pod managers may be used for pod management operations.

Environment 500 further includes a management interface 522 that is used to manage various aspects of the environment. This includes managing rack configuration, with corresponding parameters stored as rack configuration data 524.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations steps may also be performed according to alternative embodiments. Furthermore, additional operations steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

What is claimed is:

1. An apparatus comprising:
a memory to store both a boot firmware code and a replacement boot firmware code and
a central processing unit (CPU) to perform a portion of the replacement boot firmware code without reboot of the CPU, wherein:
the boot firmware code is associated with a first System Management Interrupt (SMI) handler,
the replacement boot firmware code is associated with a second SMI handler,
the second SMI handler comprises an alternate version of the first SMI handler,
the first SMI handler and the second SMI handler are stored simultaneously in the memory, and
the perform a portion of the replacement boot firmware code without reboot of the CPU comprises execute the second SMI handler.

2. The apparatus of claim 1, wherein the CPU is to reserve a region of the memory for the both the boot firmware code and the replacement boot firmware code and wherein the reserved region of the memory comprises a region that is not configured for access by an operating system (OS).

3. The apparatus of claim 2, wherein the reserved region of the memory comprises System Management Random Access Memory (SMRAM).

4. The apparatus of claim 1, wherein the boot firmware code comprises one or more of: Basic Input/Output System (BIOS), Universal Extensible Firmware Interface (UEFI), a boot loader, or System Management Interrupt (SMI) handler and wherein the replacement boot firmware code comprises one or more of: a BIOS, UEFI, a boot loader, or an SMI handler.

5. The apparatus of claim 1, comprising a processor to load the replacement boot firmware code from a storage device into the memory.

6. The apparatus of claim 5, comprising one or more of a bus, interface, fabric, or network, wherein the storage device is locally or remotely connected with the CPU using one or more of the bus, interface, fabric, or network.

7. The apparatus of claim 1, wherein the CPU is to perform the portion of the replacement boot firmware code based on authentication of the portion of the replacement boot firmware code.

8. The apparatus of claim 1, comprising a server, data center, or rack, wherein the server, data center, or rack comprises the memory and the CPU.

9. The apparatus of claim 1, wherein the second SMI handler comprises an updated version of the SMI handler.

10. The apparatus of claim 1, wherein the replacement boot firmware code comprises a Universal Extensible Firmware Interface (UEFI) capsule.

11. A method comprising:
based on execution of a portion of a first version of boot firmware code by a processor, generating a region in memory of a size to store the first version of boot firmware code and a second version of boot firmware code and
based on a detected indication of an update to boot firmware code, storing a portion of the second version of boot firmware code in the region in the memory, wherein:
the first version of boot firmware code is associated with a first System Management Interrupt (SMI) handler,
the second version of boot firmware code is associated with a second SMI handler,
the second SMI handler comprises an alternate version of the first SMI handler,
the first SMI handler and the second SMI handler are stored simultaneously in the memory; and
performing a portion of the second version of the boot firmware code by executing the second SMI handler.

12. The method of claim 11, wherein the first version of the boot firmware code comprises one or more of: Basic Input/Output System (BIOS), Universal Extensible Firmware Interface (UEFI), a boot loader, or System Management Interrupt (SMI) handler and wherein the second version of the boot firmware code comprises one or more of: a BIOS, UEFI, a boot loader, or an SMI handler.

13. The method of claim 11, wherein the region in the memory comprises a region that is not configured for access by an operating system (OS).

14. The method of claim 11, wherein the region in the memory comprises System Management Random Access Memory (SMRAM).

15. The method of claim 11, comprising loading the portion of the second version of boot firmware code into the memory from one or more of: a locally connected storage device, a network accessible storage device, or a fabric accessible storage device.

16. The method of claim 11, wherein the storing the portion of the second version of boot firmware code in the memory comprises authenticating the portion of the second version of boot firmware code prior to storing the portion of the second version of boot firmware code in the memory.

17. At least one non-transitory computer-readable medium, comprising instructions stored thereon, that if executed by one or more processors, cause the one or more processors to:
allocate a region in memory that is hidden from an operating system (OS), wherein the region is to store at least a first version of boot firmware code and a second version of boot firmware code;
based on an indication of a second version of a boot firmware code and authentication of the second version of the boot firmware code, copy a portion of the second version of the boot firmware code into the region, wherein:
the first version of boot firmware code is associated with a first System Management Interrupt (SMI) handler,
the second version of boot firmware code is associated with a second SMI handler,
the second SMI handler comprises an alternate version of the first SMI handler,
the first SMI handler and the second SMI handler are stored simultaneously in the memory; and
perform a portion of the second version of boot firmware code by executing the second SMI handler.

18. The at least one non-transitory computer-readable medium of claim 17, wherein the second version of boot firmware code comprises one or more of: Basic Input/Output System (BIOS), Universal Extensible Firmware Interface (UEFI), a boot loader, or System Management Interrupt (SMI) handler.

19. The at least one non-transitory computer-readable medium of claim 17, comprising instructions stored thereon, that if executed by one or more processors, cause the one or more processors to:
attempt to validate the second version of the boot firmware code and
do not permit execution of a portion of the second version of the boot firmware code of the boot firmware code based on failure to validate the second version of the boot firmware code.

20. The at least one non-transitory computer-readable medium of claim 17, comprising instructions stored thereon, that if executed by one or more processors, cause the one or more processors to:
rollback to execution of a prior version of the boot firmware code stored in the region.

* * * * *